Patented Apr. 6, 1943

2,315,850

UNITED STATES PATENT OFFICE 2,315,850

MANUFACTURE OF RUBBER

Roscoe H. Gerke, Nutley, N. J., assignor to United States Rubber Company, New York, N. Y., a corporation of New Jersey No Drawing. Application May 25, 1940, Serial No. 337,205

4 Claims. (Cl. 260—763)

This invention relates to improvements in the technique of processing high carbon black-rubber mixes prior to vulcanization thereof.

The technique of processing high carbon black-rubber mixes prior to vulcanization thereof, whereby to obtain vulcanizates with improvements in physical and chemical properties, is described in Gerke et al. U. S. P. 2,118,601. The improved vulcanizates prepared by this technique differ from the usual vulcanizates produced by older techniques in that they have relatively (1) lower modulus at low elongation, (2) high resistance to abrasion, (3) higher modulus above 300% elongation, (4) low torsional hysteresis, (5) high electrical resistivity, and are (6) relatively softer.

These aforesaid vulcanizates are obtained by incorporating in the rubber a relatively large amount of carbon black, for example, at least 25 parts, and preferably at least 40 parts in the case of the tire treads, by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide chemical promoters of the processing of rubber-carbon black mixes described in U. S. P. 2,118,601 and referred to as a non-conventional processing, whereby to attain high electrical resistance and low torsional hysteresis of tread stocks. A further object is to provide substantial decreases in the time of the non-conventional processing by the use of the herein disclosed chemicals, with consequent increase in the capacity and output of equipment. Other objects will be apparent from the following description.

I have discovered that the heating operation can be materially shortened by adding to the mixture of rubber and carbon black, with or without softeners—prior to the heat treatment, the chemical, hydrazine. The promoter increases the rate of increase of electrical resistivity in the process of U. S. P. 2,118,601.

In the following examples illustrating the invention, the "parts" are by weight and refer to parts per 100 parts of rubber:

|  | A | B |
|---|---|---|
| Smoked sheet | 100 | 100 |
| Carbon black | 50 | 50 |
| Stearic acid | 4.5 | 4.5 |
| Pine tar | 1.6 | 1.6 |
| Hydrazine |  | 1 |

These mixes were given a heat treatment by milling for 12 minutes on a roll mill, whose rolls were heated to 315° F. and maintained at that temperature during the milling operation. The master batches so heat treated were then milled on cold mill rolls to recovery of plastic properties i. e. reduced to a viscosity suitable for milling in of further compounding ingredients. The following ingredients were then added:

|  | A | B |
|---|---|---|
| Stearic acid | 0.5 | 0.5 |
| Pine tar | 0.4 | 0.4 |
| Zinc oxide | 2 | 2 |
| Antioxidant | 1 | 1 |
| N,N'-diphenyl p-phenylene diamine | 0.35 | 0.35 |
| Accelerator | 1 | 1 |
| Sulfur | 2.62 | 2.62 |

The above mixes were then vulcanized 30 minutes at 296° F. and yielded the following data:

|  | A | B |
|---|---|---|
| Electrical resistance (ohm-cm) | $1 \times 10^{10}$ | $1 \times 10^{12}$ |
| Torsional hysteresis at 280° F | .092 | .073 |
| US abrasion | 159 | 165 |
| Adams hardness | 36 | 38 |

It will be seen that addition of hydrazine to compound B enabled more rapid attainment of high electrical resistance, low torsional hysteresis and improved abrasion resistance.

With respect to the processing of tire tread compositions it is understood that such compositions before they are vulcanized are to be subjected to the usual steps of shaping, manipulation and mounting attendant upon the manufacture of a vehicle tire, whether of the solid or pneumatic variety, and in which the final article embodies at least as its tread portion, the vulcanized composition of the invention.

Electrical resistivity was determined by measuring the resistance of a specimen of known thickness (about 0.1 inch) placed between mercury electrodes, under a potential difference of 135 volts, using a sensitive galvanometer with an Ayrton shunt.

The torsional hysteresis represents the logarithmic decrement (base 10) of the observed amplitudes of successive oscillations of a torsion pendulum, measured at 280° F. (137.8° C.) with an apparatus consisting essentially of a torsion pendulum in which the sample of rubber tested supplies the restoring force when the pendulum is deflected. For further description of this testing see U. S. P. 2,118,601.

The visible changes taking place in the hot milling method as described in the above examples are somewhat similar to those described in U. S. P. 2,118,601. However, the viscosity increase during high temperature treatment may even be greater. As the hot milling proceeds the mix finally begins to smooth out. The The smoothing out need not necessarily be done on the hot mill but it may be subsequently carried out on a cool mill. In the steam process in which the mix is not milled during heating, smoothing out does not occur in the heater but is obtained upon the relatively cooler recovery mill.

The invention is not limited to the amount of chemical, although the preferred amounts vary from 0.05 to 2.0 parts per one hundred parts of rubber.

The chemical promoter may be added at any time during or preceding the heat treatment, that is, it may be added to the rubber before the carbon black, along with it or after the carbon black, and then the resulting master batch subjected to the heat treatment. It is understood that this is controlled within limits avoiding serious degradation of the rubber since it is known that either excessive milling of rubber in air or excessive heating at elevated temperatures of rubber tends to break down (degrade) the rubber molecules. Rubber vulcanizates made from degraded rubber have unusually low tensile strength, poor resistance to tear, and poor resistance to ageing. By the present invention the tensile strength of the resulting vulcanizates is not lowered more than 10% by the heat-treatment. Instead of heat treating on a mill, the heating may be conducted in a heater in an atmosphere of hot air, steam, nitrogen, or a mixture of air and steam, or in water, etc. Where heating is carried out in a medium such as steam or a mixture of air and steam, the stock is preferably heated while in thin layers, while the mixture is static, i. e. there is no mechanical agitation of the mix taking place, as distinguished from a masticating or milling operation. Also, in carrying out the invention the usual softeners and other ingredients, may be included, if desired, in the initial mixture of rubber, black and chemical for the purpose of softening the rubber and facilitating the admixture and distribution of the black therein, or for the purpose of improving the properties of the final vulcanizates; for example, such softeners as oils, tars, fatty acids, fatty acid soaps, and mineral rubber, may be added. The raw rubber may also be blended with reclaimed rubber in any proportions. The rubber used in the master batches may have been softened by any of the processes known to the art, such as heating in air, steam or mixtures thereof, or mastication in the presence of zinc oxide, zinc soaps, lead dioxides, or other types of plasticizing agents.

Whereas the invention is adaptable broadly to all kinds of black it is particularly concerned with what are known as rubber reinforcing blacks, which blacks are herein distinguishable from the so-called soft rubber blacks of larger particle size, which are non-reinforcing, and flocculable to a lesser extent by heat, and from blacks of extremely small particle size like paint black and ink blacks.

While the invention is particularly significant in relation to tire tread compositions, it is also applicable to the manufacture of any rubber products in which are desired the qualities of high abrasion resistance, toughness, flexibility, high electrical resistivity or low hysteresis, etc., such as footwear outsoles, pneumatic inner tubes, hose, belting, vibration-absorbing mountings, tank linings, etc.

The term "rubber" is used in its usual generic sense applicable to caoutchouc and similar vulcanizable gums, as well as to various synthetic rubbers and rubber-like products which have properties in common with natural rubber whereby they may be adapted to the same commercial uses.

The use of hydrazine is not limited as to the temperature, time, pressure, or method of vulcanization. Also vulcanizing agents other than sulfur may be used for the vulcanization of the compounds used. They may be used in rubber mixes subjected to mold cures, air cures, ammonia cures, submarine cures, steam cures, etc.

The promoter, as stated above, may be added before or during heat treatment, may be put into the rubber by mill incorporation, by impregnation, or otherwise.

Having thus described my invention, what I claim and desire to protect by Letters Patent is:

1. A process which comprises mixing rubber with a relatively large amount of carbon black, and a small amount of hydrazine, heating the mix to severely flocculate the black at a temperature substantially above 250° F. but not above about 370° F., and thereafter masticating the mix to substantially completely disperse the flocculated black.

2. A process which comprises mixing rubber with a relatively large amount of carbon black, and a small amount of hydrazine, heating the mix to a temperature substantially above 250° F. but not above about 370° F., and thereafter masticating the mix to a viscosity suitable for the incorporation of additional compounding ingredients and vulcanizing ingredients.

3. A process which comprises mixing rubber with at least 25 parts by weight of carbon black based on the rubber, and a small amount of hydrazine, heating the mix to a temperature substantially above 250° F., and not in excess of about 370° F., and thereafter masticating the mix to a viscosity suitable for incorporating additional desired compounding ingredients.

4. In the process of treating carbon black-rubber mixes which comprises subjecting a substantially homogeneous mixture of rubber and carbon black to a heat treatment at a temperature substantially above 250° F. but not above about 370° F. and masticating the heat-treated mix, the improvement which comprises adding a small amount of hydrazine to the mix after the incorporation of the carbon black and prior to the heat treatment, whereby the carbon black in the mix attains a highly deflocculated and particulate state of dispersion in a shorter time than it would under similar treatment in the absence of the drydrazine.

ROSCOE H. GERKE.